OPTICAL NON-DESTRUCTIVE READ OUT MEMORY

Original Filed Dec. 26, 1963

INVENTOR
FREDERICK F. MOREHEAD JR.

BY [signature]
ATTORNEY

United States Patent Office 3,361,910

Patented Jan. 2, 1968

3,361,910
OPTICAL NON-DESTRUCTIVE READ OUT MEMORY

Frederick F. Morehead, Jr., Yorktown Heights, N.Y., assignor to International Business Machines Corporation, New York, N.Y., a corporation of New York Continuation of application Ser. No. 333,587, Dec. 26, 1963. This application June 16, 1966, Ser. No. 560,946
6 Claims. (Cl. 250—71)

The present invention relates to a memory element suitable for optical storage and interrogation. More particularly, it relates to such a memory element and system adapted for the non-destructive read out of information therefrom. This application is a continuation of application Ser. No. 333,587, filed on Dec. 26, 1963, now abandoned.

Many different types and varieties of storage systems are utilized with today's high speed electronic computers. Among these are magnetic drum and core storage memories, capacitor-diode memories, thin film memories, cryogenic memories and certain types of ELPC memories. Of all of the above enumerated types of memories, very few are capable of non-destructive read out operation. Further, all of the above types of memories require actuation by electrical impulses for both reading and writing operations. Most of the above memories which are operated by such electrical currents include current switching devices which have finite turn on and turn off times which are quite limiting in the speed of operation of the resultant memories.

At the present, many new optical devices are being developed, such as various types of lasers, light emissive semiconductor junctions, various types of electronic light switches and the like, however, to date no suitable optical storage element utilizing light as the sole input and read out actuating source and having non-destructive read out characteristics is known.

It has now been found that a non-destructive memory or storage element capable of having information written into and read out of same solely by optical means is attainable. By utilizing a zinc sulfo-selenide compound as the storage element and maintaining the system at substantially liquid nitrogen temperature, it is possible to write binary information into the device and subsequently, read the state of the device non-destructively or alternatively, erase the pre-existing state of the device. All of these results are obtained by irradiating the novel storage element of the present invention with different wavelengths of light and detecting emitted radiation from the device itself.

It is accordingly a primary object of the present invention to provide a novel optical storage element.

It is a further object to provide such a storage element capable of having information written into and read out thereof solely by optical means.

It is another object to provide such a device wherein irradiation with an interrogation wavelength produces an output of a characteristic wavelength.

It is yet another object to provide such a device wherein information stored therein can be erased therefrom by irradiation with still another wavelength of light.

It is a still further object to provide such a device which requires no electrical energization.

It is yet another object to provide such a device capable of producing high gain optical energy amplification.

The foregoing and other objects, features and advantages of the invention will be apparent from the following more particular description of preferred embodiments of the invention, as illustrated in the accompanying drawings.

In the drawings:

FIGURE 1 is a perspective view partly in cross-section of a single optical storage element constructed in accordance with the teachings of the present invention.

FIGURES 2*a* through 2*d* constitute an energy level diagram illustrating the physical concepts involved in the functioning of the device of the present invention.

Figure 3:
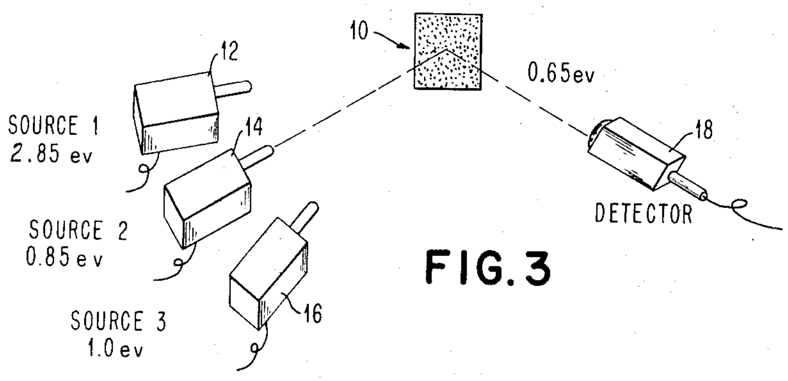
FIGURE 3 is a diagrammatic representation of a very basic system utilizing a single storage element.

The objects of the present invention are accomplished in general by a zinc sulfo-selenide layer comprising the storage element, means to maintain said element at substantially liquid nitrogen temperatures, a first optical source for irradiating said element producing a first wavelength capable of filling T and C centers in said element to characterize a first storage condition of said element, a second radiation source for irradiating said element producing a second wavelength to selectively excite said filled C centers, said excitation being followed by an output radiation of a third wavelength, and a third source of illumination for de-populating or emptying both said T and C centers to effectively erase the information stored in said element.

The optical storage element of the present invention may be utilized as a single element in a matrix or as a coating on a piece of continuous flexible tape where information might be stored as in a magnetic tape to store binary coded information suitable for use with various types of electronic calculators and the like. Utilizing the principles of the present invention, a storage element is produced in which all information is read in and out thereof solely by optical means. A writing or energization frequency is first applied to the device and certain physical changes occur therein as will be explained more fully subsequently so that information, i.e., a binary "one," may be considered as stored therein. A non-destructive read out radiation source is then shone on the device and if the element has been previously energized, there will be an output radiation from the device having a different wavelength than that being concurrently shone thereon. Conversely, if no information has previously been stored, there will be no output. It should be noted, that this second or non-destructive interrogation frequency wavelength radiation may be repeatedly shone on the device at subsequent time intervals and if the element has not been erased, the interrogation radiation will cause the element to produce said characteristic output radiation. Lastly, when it is desired to erase the element, light of a third wavelength is shone on the device which causes the material to return to its original or unactivated state. At this time, there is a second output radiation which, if desired, may be used for some purpose such as indicating that information has been stored in the device. In the majority of systems, utilizing such an element where non-destructive read out is obtainable, it is not likely that this second output radiation attendent with a destructive read out from the device would be used inasmuch as non-destructive read out operation is desired over destructive read out in the majority of instances.

It may thus be seen that the storage element of the present device may be incorporated in any system where it is desired to effect information storage at a first time and subsequently release said information for use at some plurality of later times. Such a storage element could, of course, be used in any of a large number of systems where it would be desired to effect information storage. It should be noted that it is not the intent of this application to describe such system in detail, but rather, the storage element itself. Accordingly, the specification will refer generally to the utility of the device in such system, however, the details will not be specifically included as they would be largely well known to persons skilled in the art.

From the above general description of the invention, it may be seen that the storage element may be used in either a non-destructive or destructive mode of operation, however, regardless of the particular mode utilized, the energization and detection means are purely optical in nature requiring no electric fields, magnetic fields or the like to attain the effects as is common with a number of current image storage devices known in the art. The following detailed description of the invention referring specifically to the drawings will clearly explain the operation thereof.

Figures 1, 4:
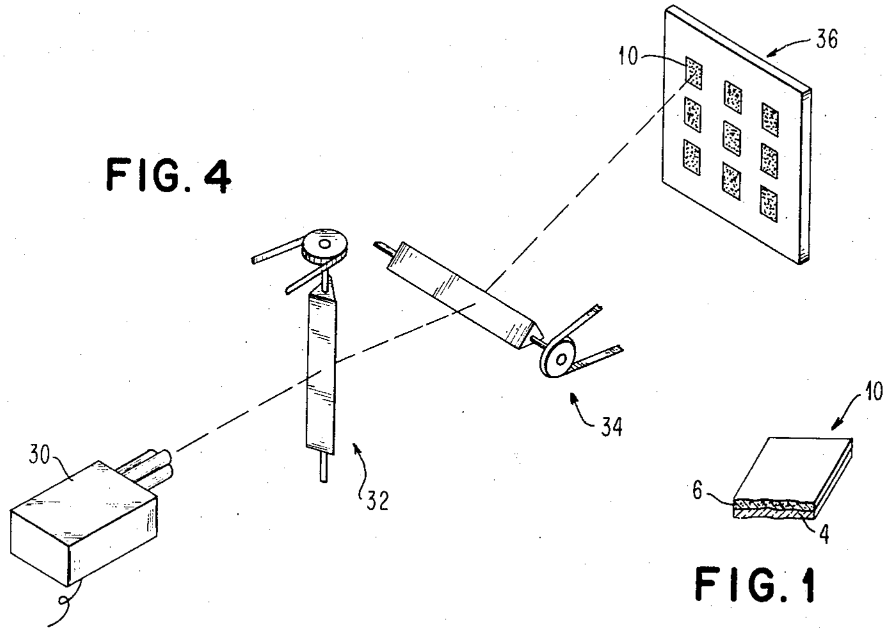
FIGURE 4 is a diagrammatic representation of a system utilizing a matrix of storage elements constructed in accordance with the teachings of the invention.

FIGURE 1 discloses a storage element constructed in accordance with the teachings of the invention. The element may be a discrete element for use in a matrix as indicated in FIGURE 4 or may constitute a coated flexible tape. The device comprises an inactive carrier or substrate 4 and the active optical storage layer 6. The substrate may be chosen from any number of compounds such as Mylar, polyvinyl acetate if a tape is contemplated or a rigid material such as an epoxy resin, Bakelite or even a metal such as aluminum if a rigid structure is desired; since the storage and read out are accomplished solely by optical means, it is unnecessary to provide any electrical or other connections to the element. The device for maintaining the element at liquid $N_2$ temperatures (not shown) would normally be a dewar flask having a suitable window therein as is well known in the art.

Figure 2:
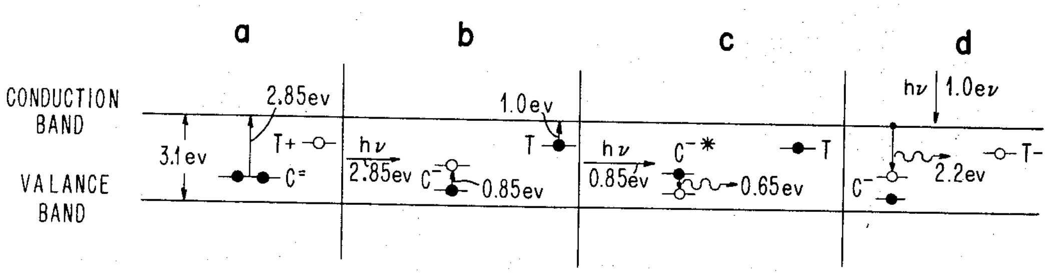

The layer 6 is made up of the compound, zinc sulfoselenide, in a range of compositions which will be specified subsequently. Referring now to FIGURE 2, an explanation of the specific physical or solid state electronic occurrences within the actual zinc sulfo-selenide layer will be attempted. This explanation, while believed to be correct, is not intended in any way to limit the scope of the invention. This figure is an energy level diagram for a zinc sulfo-selenide compound constructed as set forth subsequently. The figure is broken into four sections, A, B, C and D. Section A illustrates the relative energy levels and band gap of the material illustrating the C and T centers before the device is energized. Section B illustrates what happens when an input radiation of 2.85 ev. or 4350 angstroms is shone on the device. This radiation introduces enough energy into the system so that both the T and C centers become filled. Section C illustrates a non-destructive interrogation wavelength of 0.85 ev. or 14,600 angstroms shone on the device and it may be seen that the C centers are caused to alternately discharge and be re-filled by this radiation at the same time producing an output radiation for the device at 0.65 ev. or 19,100 angstroms. It will be noted from this section of the figure that the T centers are unaffected by the 0.85 ev. radiation. Section D of the figure illustrates what happens in the system when an erasing radiation input of 1.0 ev. or 12,400 angstroms is shone on this system. Both the T and C centers are de-populated or emptied permanently and an output radiation of 2.2 ev. or 5650 angstroms is produced by the system. This 2.2 ev. radiation may be used if desired; however, as indicated previously, the non-destructive mode of operation or a 0.65 ev. detection scheme would, in all probability, have the greatest utility in a practical system utilizing the device. As stated, the element may be erased by shining a 1.0 ev. radiation thereupon, however, an alternative method of erasure is by heating the device to about 200° K., which achieves the same results, i.e., de-populating the T and C centers.

The C and T centers can be introduced into the ZnS, Se system by suitably firing with Cu and Cl in appropriate chemical combination, i.e., $CuCl_2$. The amount of doping is not critical since light or saturation doping does not produce a significantly different result. Other members of groups I or V in the Periodic Table may be substituted for Cu and other members of groups III or VII for Cl. The resulting system is a compensated semiconductor with an ionized donor level near the conduction band and a doubly ionized acceptor level near the valence band, as shown in FIGURE 2*a*. Suitable excitation of the system at low temperatures removes an electron from the doubly ionized acceptor (C center) which electron is subsequently trapped at the ionized donor (T center). The energy of the photons which will de-populate the T centers (destructive read out) and excite the C centers (non-destructive read out) (FIGURE 2*b*) can be varied by changing the composition of the system $ZnS_xSe_{1-x}$; where $x$ is the atomic fraction of S. Specifically, the energy required to excite the C center is lowered, with increasing Se (decreasing $x$); the energy required to ionize the T centers (restoring the system to its original, equilibrium state) remains essentially unchanged. Thus, a photon energy exists for each of a range of compositions such that it can excite the C center (which subsequently emits a longer wavelength) without de-populating the T centers. This photon energy or non-dstructive read out radiation, i.e., the 0.85 ev. radiation, must be of sufficient photon energy to cause the C centers to be excited, but less than that required to ionize the donor or acceptor centers which would, of course, empty same and render the device inactive.

It may also be seen by referring to the energy level diagram of FIGURE 2 that this system could be used as an optical energy amplifier wherein a few 2.85 ev. photons could be converted to many 0.64 ev. photons. It is, of course, understood that for such operation, a 0.85 ev. radiation source would have to be used to produce the 0.65 ev. radiation output. The system in this case would actually be indicating that some 2.85 radiation was present if some of the C and T centers were filled, thus allowing the production of 0.65 ev. radiation from the device upon impingement of the 0.85 ev. activation source.

The zinc sulfo-selenide optical storage element according to the invention is preferably made by alloying zinc selenide and zinc sulfide together and introducing into the resultant alloy suitable impurities to form the aforementioned donor and acceptor centers. A preferred compositional range for the device is approximately 60 percent sulfur and 40 percent selenium by weight of the total amount of sulfur and selenium present. However, it should be understood that operative devices may be made according to the teachings of the invention wherein the selenium sulfur ratio exceeds ⅓, i.e., over 33 percent selenium. As stated previously in the description of the theory of operation of this device referring to FIGURE 2, other materials than Cu and Cl may be used to introduce the donor and acceptor impurities into the system, i.e., members of groups I and V may be substituted for the Cu and members of groups III and VII substituted for the Cl, where either the elements or suitable compounds containing them may be used in the preparations which are known to the art.

The following is an example of a method by which an optical storage element may be made according to the teachings of the present invention.

*Example I*

Zinc sulfide and zinc selenide powder is mixed to achieve the relative weight percentages of the sulfur and selenium outlined above and thoroughly ground to a uniform consistency together with $10^{-4}$ weight percentage of $CuCl_2$ for example, as the source of dopant material. The resultant powdered mixture is then sealed in a quartz capsule, evacuated and fired to a temperature of about 1000° C. for approximately 60 minutes. The material is then removed from the capsule, re-ground, mixed with a suitable binder and applied to the substrate.

In FIGURE 3, the optical storage element 10 is indicated as a discrete piece of material, it being reiterated that this could conveniently be a portion of a flexible tape having a suitable zinc sulfo-selenide storage layer thereof.

Light sources 12, 14 and 16 are located so that when energized, they will direct radiation upon a predetermined portion of the storage element 10. A detector 18 is so located that it is capable of receiving emitted radiation from the tape 10. A suitable detector 18 is a lead sulphide photoconductor. It is, of course, necessary to install a filter in the light path of the detector which will admit only radiation of the characteristic output of the storage element 10 operating in the non-destructive read out mode, i.e., 0.65 ev. or 19,100 angstroms. Such filters are well known in the art. It would very likely be possible to tailor a specific photoconductor energized by 0.65 ev. photons in which case a multi-layer device could be built wherein the storage element and detector would constitute a unitary device.

Referring again to FIGURE 3, source 1, 12, represents the write or energization source for the device which activates the C and T centers to effectively write a binary "one" into the device. The source 2, 14, comprises the non-destructive read out energization source which causes the element to produce a first output radiation upon energization thereby. Source 3, 16, represents the erasing wavelength radiation source utilized to empty the T and C centers which were previously filled by source 1. Thus referring again to FIGURE 2, source 1 provides a radiation of 2.85 electron volts or 4350 angstroms wavelength, source 2 produces a wavelength of 0.85 ev. or 14,600 angstroms and source 3 produces a wavelength of 1.0 ev or 12,400 angstroms. It will also be noted that the wavelength of the first output radiation indicated in the figure is 0.65 ev. or 19,100 angstroms.

Referring now to FIGURE 4, there is shown by way of example, a very simple matrix utilizing a plurality of individual storage elements constructed in accordance with the teachings of the present invention. The box 30 represents a plurality of energization sources incorporating the three sources 12, 14 and 16 of FIGURE 1 but directed along a common line. Also included in this box would be a detector such as shown at 18 in FIGURE 3 directed along the same line. Selective addressing of the individual elements of the matrix is accomplished by the relatively simple movable prisms 32 and 34 which provide horizontal and vertical traverse respectively of the matrix 36. By use of the very crude system shown in FIGURE 2, it is possible to select a particular one of the matrix elements to either write information in or interrogate said element to determine its state. Such a device might possibly be used as a buffer memory in an electronic computer. Circuitry for rotating the directing prisms 32 and 34 as well as control circuitry for selectively energizing the three radiation sources for the system are not shown as they do not constitute part of the present invention and are furthermore well known in the electronic arts.

As will be apparent from the above description of the storage element and the generalized description of a number of systems in which such an element may be used that such a storage element provides a method of storing information not hitherto available in the electronics art.

It should further be noted that the storage device of the present invention, in addition to storing discrete bits of binary data, could also be used to store specific photo images by masking desired areas of the element and exposing the rest to an energizing radiation in exactly the same manner as set forth above.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of storing and accessing information which comprises:

irradiating a zinc phosphor compound suitably doped to provide ionizable donor levels adjacent to the conduction band of said compound and first and second different ionizable acceptor levels adjacent to the valence band of said compound, all of said levels lying within the forbidden gap for said compound, with a radiation of a first wavelength to substantially fill said donor level and vacate the acceptor level furthest from the valence band of said compound, to store information in said compound, irradiating said layer with light of a second wavelength of characteristic energy $E_1$ to cause the acceptor level closest to the valence band to be emptied and the acceptor level furthest from said valence band to be filled, removing said light of second wavelength whereby electrons in said acceptor level furthest from said valence band return to said acceptor level closest to said valence band accompanied by an infrared radiation having characteristic energy $E_2$, whereby said compound is non-destructively interrogated.

said characteristic energies conforming to the formula $E_1 > E_2$, and maintaining said compound at liquid nitrogen temperatures.

2. A method as set forth in claim 1 including the step of irradiating said compound with light of a third wavelength having a characteristic energy $E_3$ to effectively empty said donor level and fill both said acceptor levels whereby information is erased from said compound, said characteristic energies conforming to the formula $E_3 > E_1 > E_2$.

3. A method as set forth in claim 2 wherein said zinc phosphor compound is a zinc sulfo-selenide.

4. A method as set forth in claim 3 wherein said compound contains 60 percent sulfur and 40 percent selenium by weight of the total amount of sulfur and selenium present in the compound.

5. A method as set forth in claim 4 wherein, the compound is doped with copper to provide the acceptor levels and with chlorine to provide the donor levels.

6. A method of storing and accessing information which comprises the steps of selectively:

irradiating a zinc sulfo-selenide phosphor compound doped with copper and chlorine to provide ionizable doner levels adjacent to the conduction band of said compound and first and second different ionizable acceptor levels adjacent to the valence band of said compound, all of said levels lying within the forbidden gap for said compound and wherein said compound contains 60 percent sulfur and 40 percent selenium by weight of the total amount of sulfur and selenium present in said compound, with a radiation of a first wavelength to substantially fill said donor level and vacate the acceptor level furthest from the valence band of said compound, to store information in said compound, irradiating said layer with light of a second wavelength of characteristic energy $E_1$ to cause the acceptor level closest to the valence band to be emptied and the acceptor level furthest from said valence band to be filled, removing said light of second wavelength whereby electrons in said acceptor level furthest from said valence band return to said acceptor level closest to said valence band accompanied by an infrared radiation having characteristic energy $E_2$, whereby said compound is non-destructively interrogated, irradiating said compound with light of a third wavelength having a characteristic energy $E_3$ to effectively empty said donor level and fill both said acceptor levels, whereby information is erased from said compound, said characteristic energies conforming to the formula $E_3>E_1>E_2$ and, maintaining said compound at liquid nitrogen temperatures.

References Cited

UNITED STATES PATENTS

| | | | |
|---|---|---|---|
| 2,742,631 | 4/1956 | Rajchman | 250—71 X |
| 2,978,417 | 4/1961 | Larach | 252—301.6 |
| 3,031,574 | 4/1962 | Halsted | 250—71 X |
| 3,081,325 | 3/1963 | Lyndhurst et al. | 252—301.6 |

ARCHIE R. BORCHELT, *Primary Examiner.*